US012573533B2

(12) United States Patent
Betancourt

(10) Patent No.: US 12,573,533 B2
(45) Date of Patent: Mar. 10, 2026

(54) MAGNETIC CORD HOLDER

(71) Applicant: Jose Betancourt, North Miami Beach, FL (US)

(72) Inventor: Jose Betancourt, North Miami Beach, FL (US)

( * ) Notice: Subject to any disclaimer, the term of this patent is extended or adjusted under 35 U.S.C. 154(b) by 214 days.

(21) Appl. No.: 18/408,945

(22) Filed: Jan. 10, 2024

(65) Prior Publication Data

US 2025/0226138 A1 Jul. 10, 2025

(51) Int. Cl.
*H01F 7/02* (2006.01)

(52) U.S. Cl.
CPC .................................. *H01F 7/0252* (2013.01)

(58) Field of Classification Search
CPC .. H01F 7/0252; F16L 37/004; H01R 13/5804; H01R 13/60
See application file for complete search history.

(56) References Cited

U.S. PATENT DOCUMENTS 10,231,682 B2 * 3/2019 Martin .................. A61B 6/512
10,302,227 B1 * 5/2019 Gustaveson, II ......... F16B 1/00
11,767,868 B2 * 9/2023 Klingler .................. F16B 5/121 248/206.5
12,418,141 B1 * 9/2025 Yue ....................... H01F 7/0252
2014/0263869 A1 * 9/2014 Clark-Mantle ........ H01R 13/72 248/65
2021/0381249 A1 * 12/2021 Klein ................. E04F 19/0472
2023/0363525 A1 * 11/2023 Middleton ......... A46B 15/0026

* cited by examiner

*Primary Examiner* — Eret C Mcnichols
(74) *Attorney, Agent, or Firm* — Lyman Moulton, Esq.; Moulton Patents, PLLC

(57) ABSTRACT

The Magnetic charger Cable is the only product of its kind that integrates a cutting-edge magnet into the cable to ensure it remains in place post-use. This unprecedented device is uniquely designed with a high-quality magnet feature that securely holds the cable in a primary location without compromising on performance, allowing for smooth and efficient cable management. An electric cord head holder includes a first magnet comprising an undercut on an underside half circumference thereof, and a reception piece comprising an overhang half circumference complementary to the underside half circumference, wherein the first magnet adheres to the head of the electric cord and the reception piece adheres to a surface and provides an anchor for the electric cord to the surface.

15 Claims, 4 Drawing Sheets

MAGNETIC CORD HOLDER

BACKGROUND

Individuals around the world have experienced the frustration of constantly searching for misplaced charger cables, whether at home, in the office, or while on the go. Furthermore, current models separate the connection part from the formal charging cable, creating a secondary piece to monitor and thus misplace. There have been no products available as original equipment or as an aftermarket to address this problem.

An apparatus that provides an easier way to keep track of your charger cables is not being met by any known device or system at present. There have been no products available as original equipment or as an aftermarket to address this problem either.

SUMMARY OF THE INVENTION

The main purpose of the Magnetic Charger Cable is to provide users with a cable that features a magnet integrated at the end for steady placement of the accessory.

An electric cord head holder includes a first magnet comprising an undercut on an underside half circumference thereof, and a reception piece comprising an overhang half circumference complementary to the underside half circumference, wherein the first magnet adheres to the head of the electric cord and the reception piece adheres to a surface and provides an anchor for the electric cord to the surface.

Figure 1:
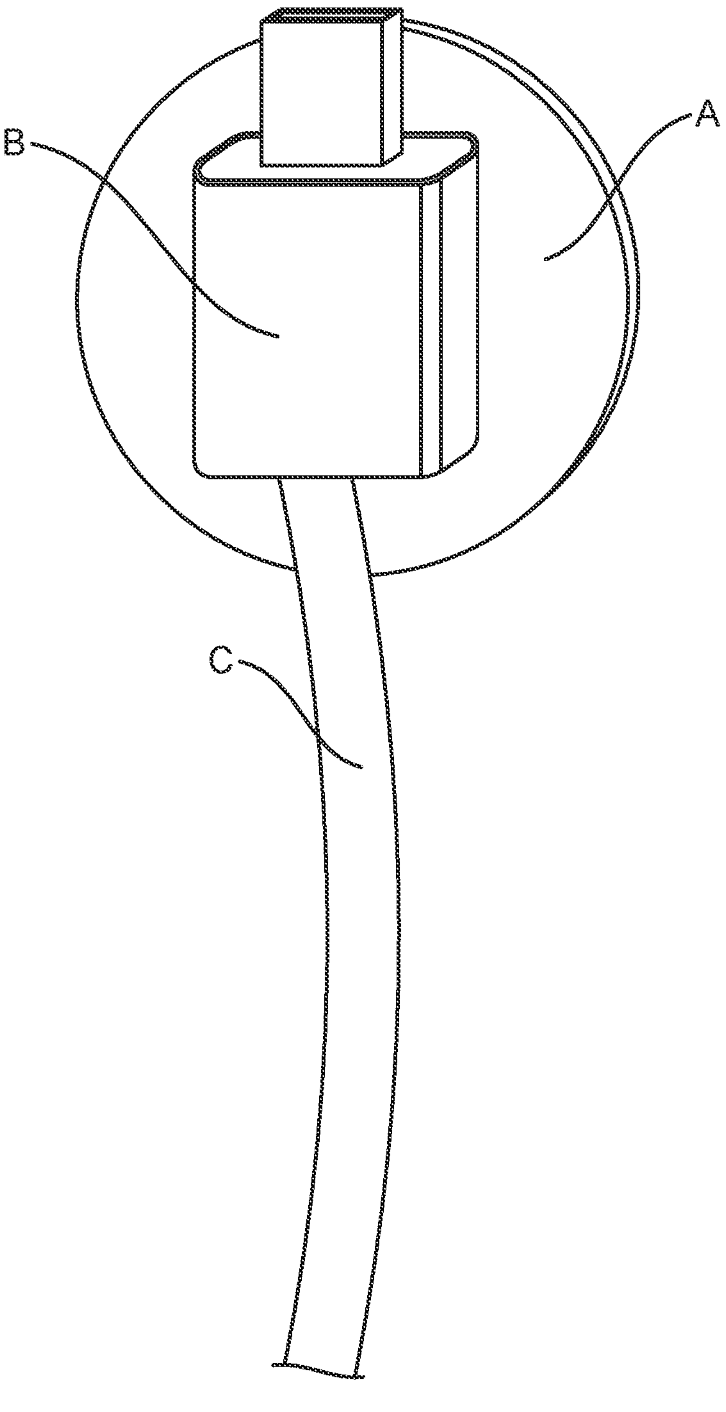
FIG. 1 is a top perspective view of the Magnetic Cord Holder in accordance with an embodiment of the present disclosure.

Throughout the description, similar reference numbers may be used to identify similar elements depicted in multiple embodiments. Although specific embodiments of the invention have been described and illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

FIG. 1 is a top perspective view of the Magnetic Cord Holder showing a reception piece with adhesive backing referenced as A, magnetic head to attach referenced as B, charging cable referenced as C, in accordance with an embodiment of the present disclosure.

Figure 2:
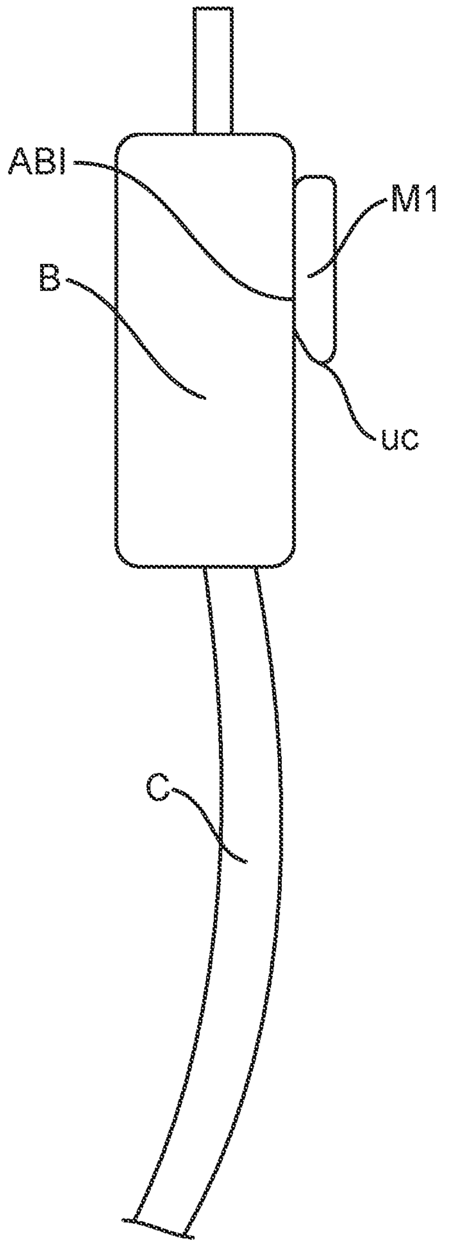
FIG. 2 is a side perspective view of the Magnetic Cord magnet attached to the cord head in accordance with an embodiment of the present disclosure.

FIG. 2 is a side perspective view of the Magnetic Cord magnet attached to the cord head in accordance with an embodiment of the present disclosure. Magnet M1 is attached to the cord head B so that an undercut UC portion of the magnet M1 is facing the end of the cord and is facing the head B. The undercut UC is complementary to the overhang (not depicted) in the magnetic piece depicted below. The adhesive backing AB1 attaches the undercut magnet M1 to the cable head B.

Figure 3:
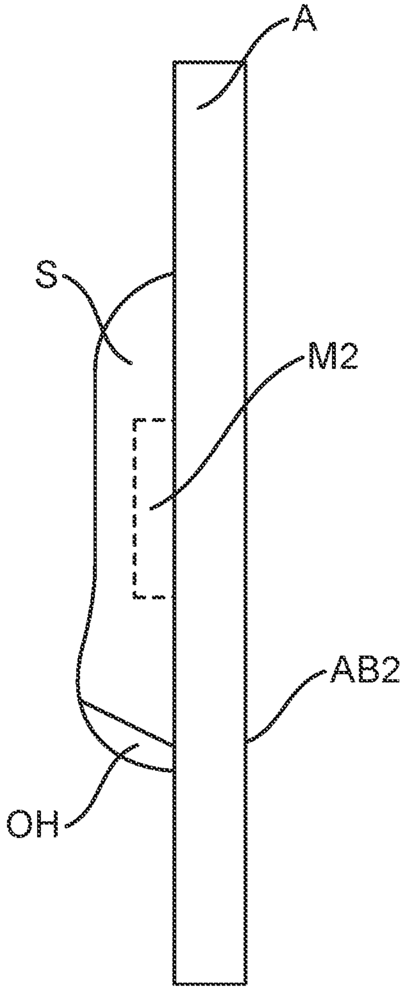
FIG. 3 is a side perspective view of the magnetic cord holder with overhang and inner magnet in accordance with an embodiment of the present disclosure.

FIG. 3 is a side perspective view of the magnetic cord holder with overhang and inner magnet in accordance with an embodiment of the present disclosure. The magnet M2 is complementary to the undercut magnet M1 is magnetic polarity. The overhang OH is geometrically complementary to the undercut of the magnet M1 to add a mechanical advantage to a gravity force pulling downward on the cord C. The reception piece A also has an adhesive backing AB2 to adhere to any wall, furniture, appliance, car interior, workspace, etc. The reception piece furthermore includes a front or a top view of a guiding shroud for guiding a reception of the first magnet into the overhang OH.

Figure 4:
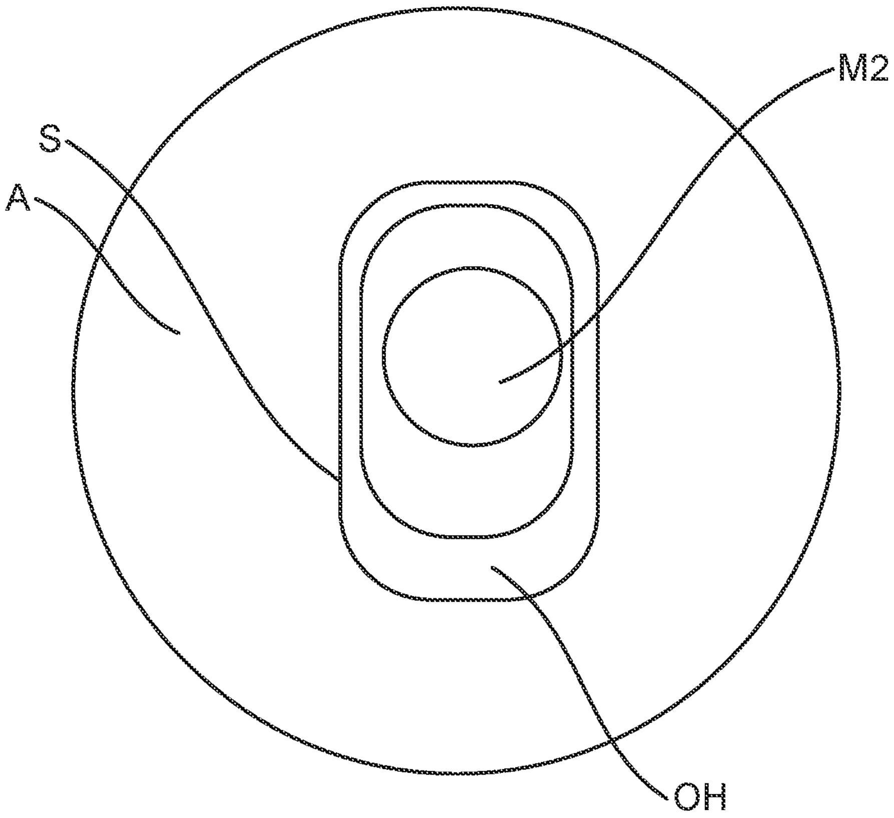
FIG. 4 is a front view of the magnetic cord holder with overhang and inner magnet in accordance with an embodiment of the present disclosure.

FIG. 4 is a front view of the magnetic cord holder with overhang and inner magnet in accordance with an embodiment of the present disclosure. The overhang portion of the magnetic piece A is shown as a wider portion from the front view and the magnet M2. The undercut of the magnet M1 slides into the overhang of the magnetic piece A for a mechanical advantage and the magnets M1 and M2 keep the undercut and the overhang proximal in a magnetic advantage. The view also includes a side view of the guiding shroud S.

The present disclosed Magnetic Cord Holder, also known as "Magnetic Charger Cable", offers a modern alternative cable design that ensures a cable is securely held in place, post-utilization. Expanding on the initial design of an average cable, the Magnetic Charger Cable introduces a novel magnet piece integrated at the end, making it effortlessly attachable to any metal or magnet attracting surface, allowing users to easily access the electronic support accessory. The magnetic attachment feature promotes a clean and organized environment, as well, permitting users to affix the charger to an easy-to-reach and/or discreet area based on preference. Whether at home or on the go, individuals will be able to experience the ease and comfort of having their charger cable readily available, exactly where they need it, at all times. The Magnetic Charger Cable ensures a cable is always within reach, organized, and ready for use.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

What is claimed is:

1. An electric cord head holder comprising:

a first magnet comprising an undercut on an underside half circumference thereof;

a reception piece comprising an overhang half circumference complementary to the underside half circumference;

wherein the first magnet adheres to the head of the electric cord and the reception piece adheres to a surface and provides an anchor for the electric cord to the surface.

2. The electric cord head older of claim 1, further comprising a second magnet in the reception piece complementary to the first magnet magnetic polarity.

3. The electric cord head holder of claim 1, wherein the reception piece itself is metallic.

4. The electric cord head holder of claim 1, wherein the reception piece itself is magnetic and opposite in magnetic polarity to the first magnet.

5. The electric cord head holder of claim 1, wherein the reception piece is shaped like a disc.

6. The electric cord head holder of claim 1, wherein the first magnet adheres to the head of the electric cord via an adhesive.

7. The electric cord head holder of claim 1, wherein the first magnet adheres to the head of the electric cord via a molten plastic which forms a plastic bond thereto.

8. The electric cord head holder of claim 1, wherein the reception piece adheres to the surface via an adhesive.

9. The electric cord head holder of claim 1, wherein the reception piece adheres to the surface via a fastener there through.

10. The electric cord head holder of claim 1, wherein the reception piece adheres to a metallic surface via a magnetic force from a magnetization of the reception piece.

11. The electric cord head holder of claim 1, wherein a diameter of the first magnet is less than a length or a width of the head of the electric cord.

12. The electric cord head holder of claim 1, further comprising a guiding shroud disposed on the reception piece and comprising the overhang.

13. The electric cord head holder of claim 12, wherein the guiding shroud also comprises a second magnet configured complementary to the first magnet.

14. The electric cord head holder of claim 12, wherein the guiding shroud has width and height dimensions smaller than a width and height of the electric cord head.

15. The electric cord head holder of claim 12, wherein an open face of the guiding shroud is larger than a diameter of the first magnet.

* * * * *